Nov. 20, 1956  R. A. YOUNG  2,771,255
MOUNTING AND DRIVE FOR HELICOPTER ROTOR
Filed Feb. 28, 1952  7 Sheets-Sheet 1
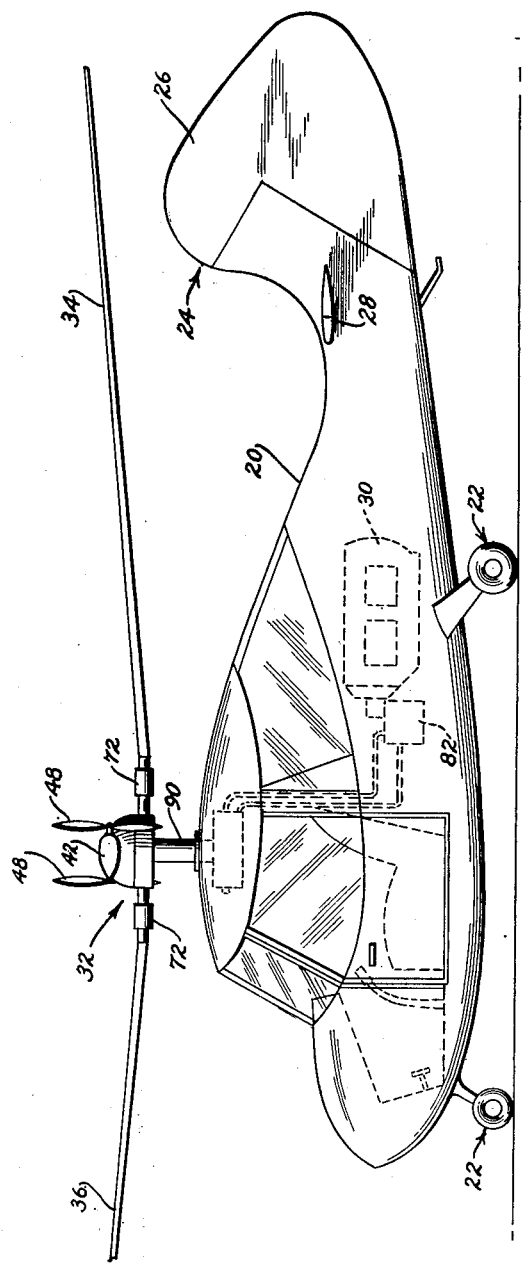
INVENTOR
Raymond A. Young
BY
ATTORNEYS Nov. 20, 1956  R. A. YOUNG  2,771,255
MOUNTING AND DRIVE FOR HELICOPTER ROTOR
Filed Feb. 28, 1952  7 Sheets-Sheet 2
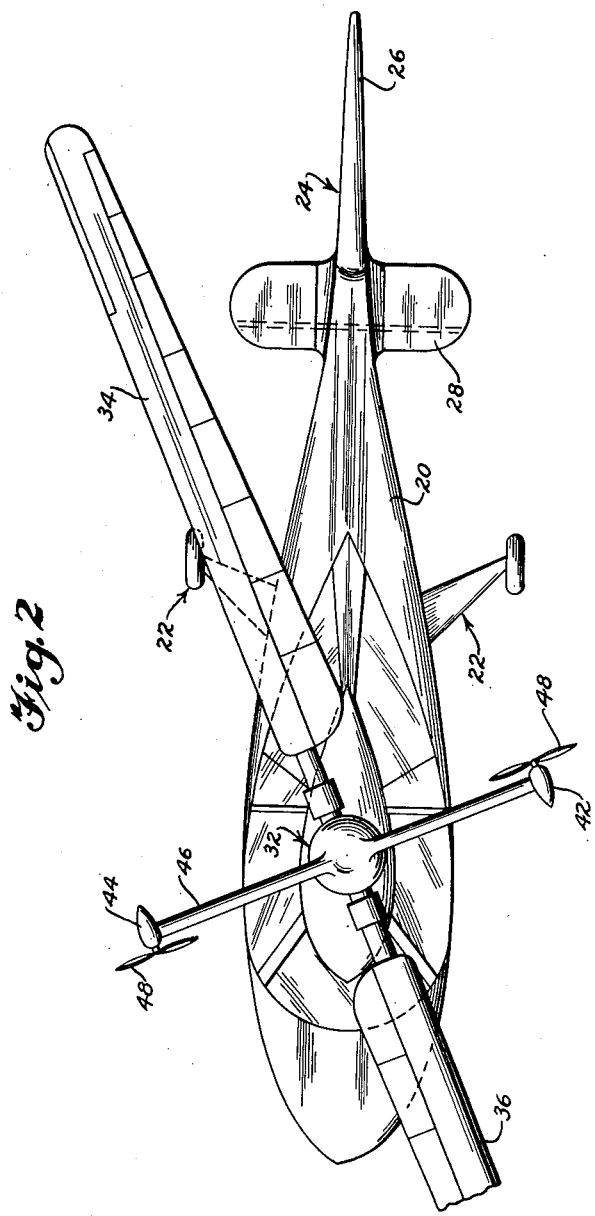
INVENTOR
*Raymond A. Young*
BY *J. Schmitt*
*Walter S. Paul.*
ATTORNEYS

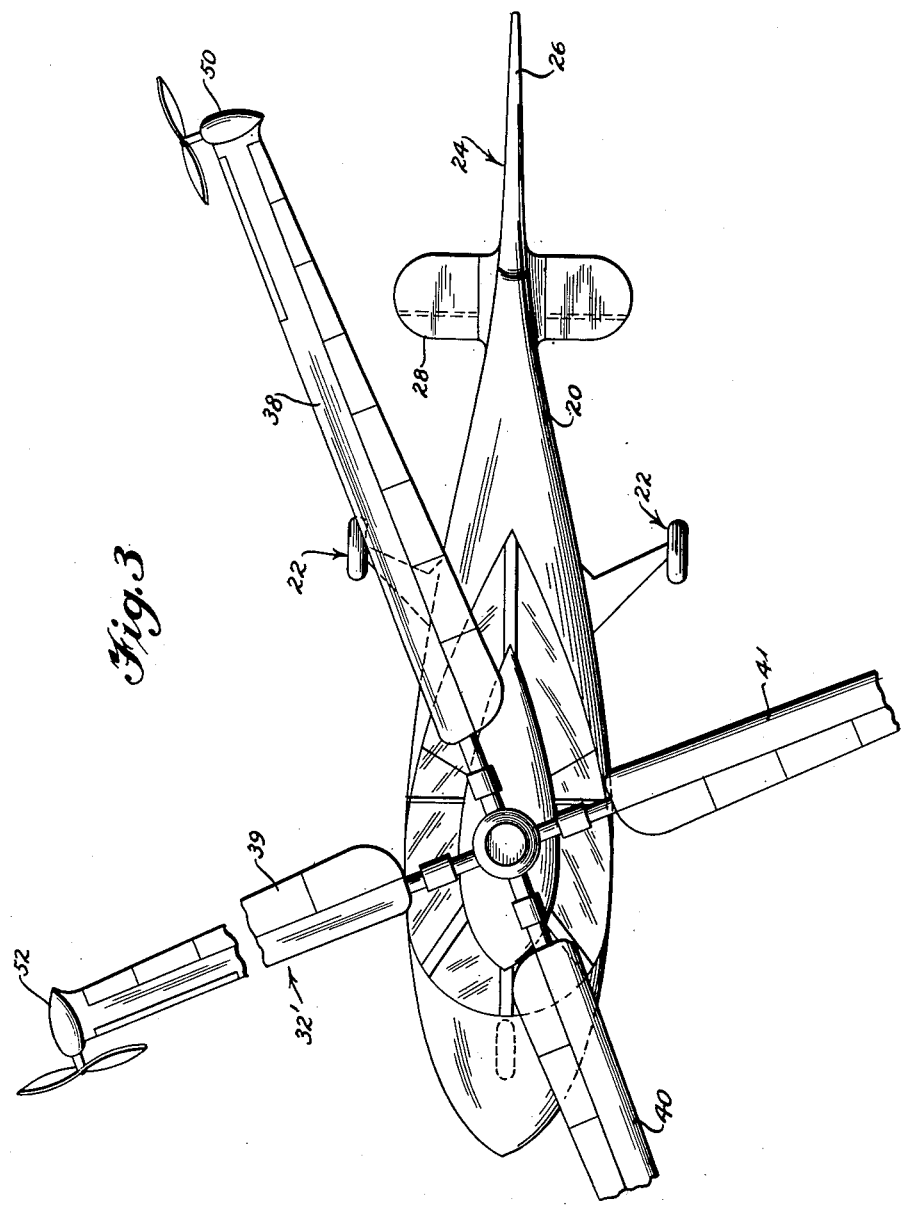

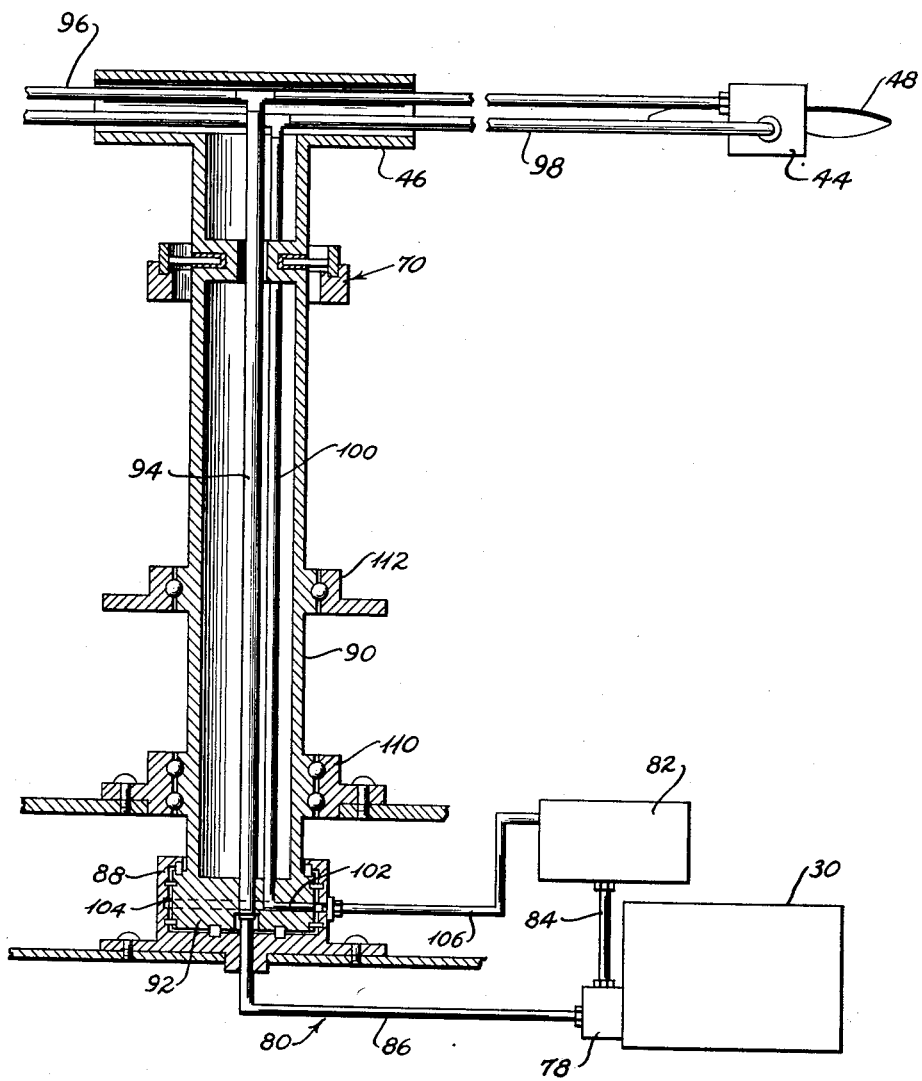

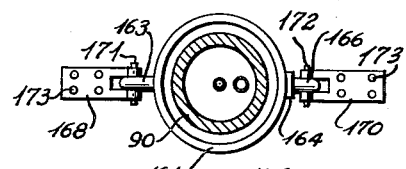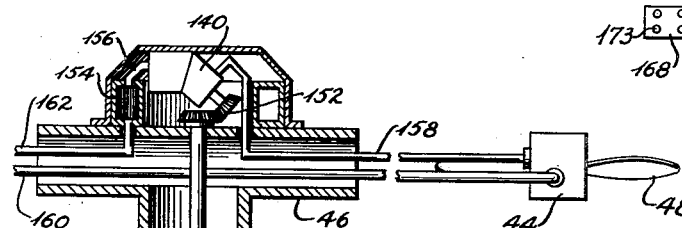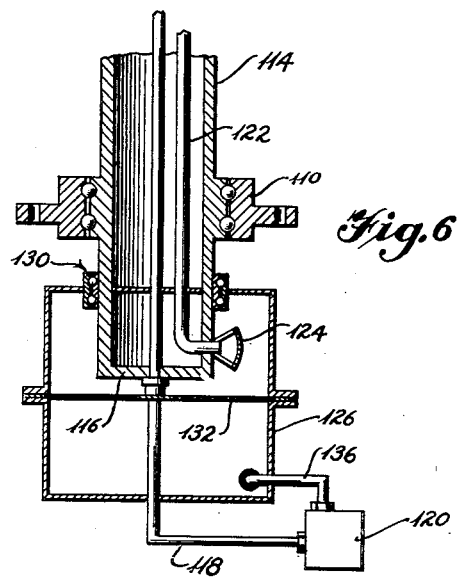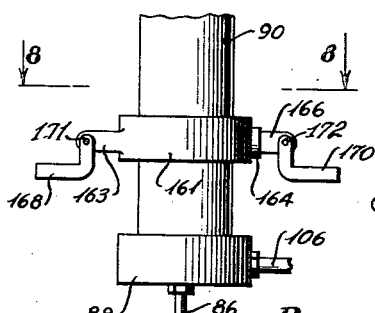

Nov. 20, 1956  R. A. YOUNG  2,771,255
MOUNTING AND DRIVE FOR HELICOPTER ROTOR
Filed Feb. 28, 1952  7 Sheets-Sheet 7
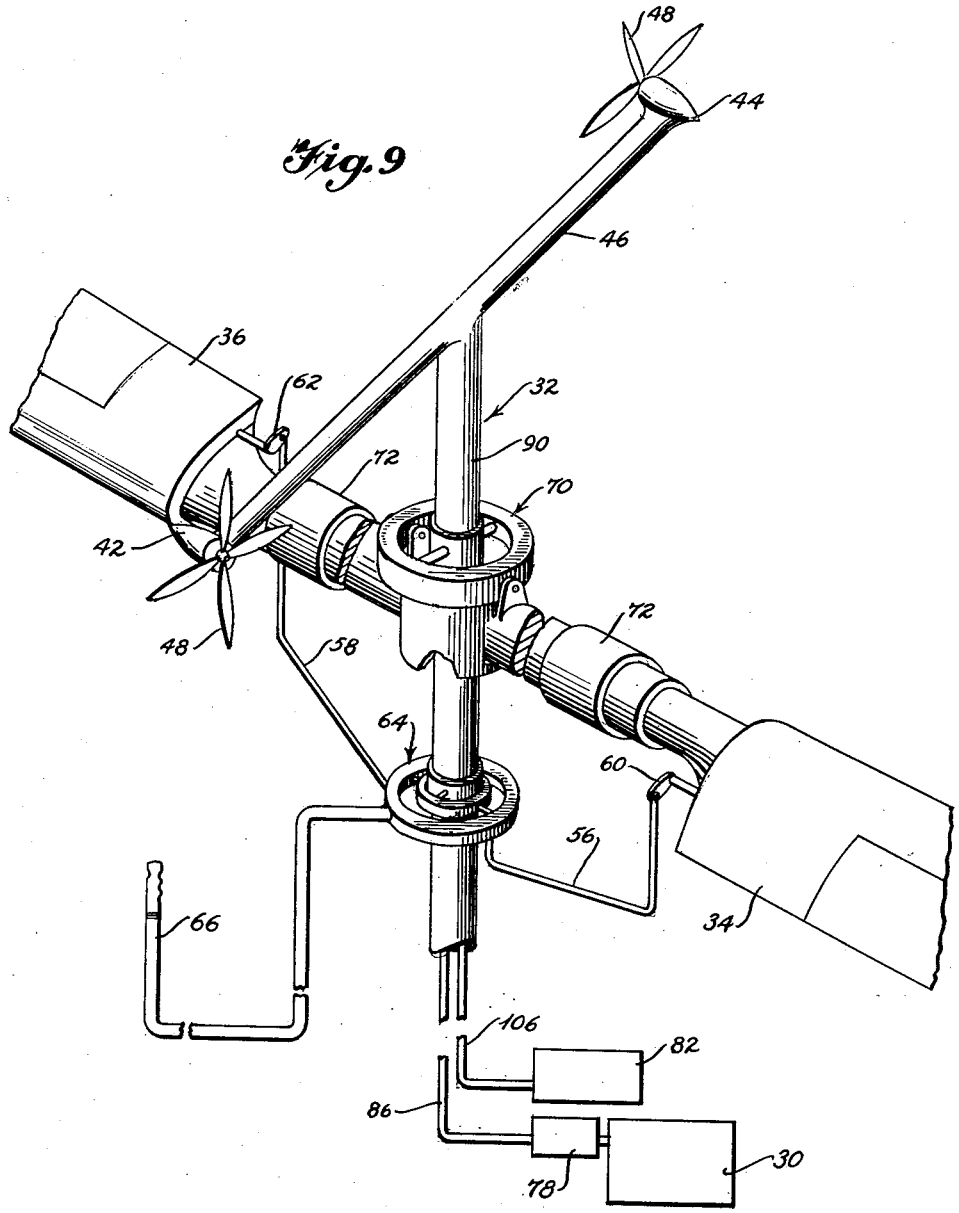
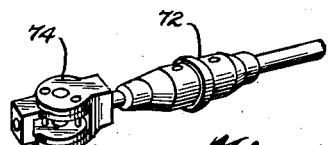
INVENTOR
Raymond A. Young
BY
J. Schmitt
Walter S. Paul
ATTORNEYS ved Nov. 20, 1956

2,771,255
MOUNTING AND DRIVE FOR HELICOPTER ROTOR

Raymond A. Young, Woodland Hills, Calif.

Application February 28, 1952, Serial No. 274,037

2 Claims. (Cl. 244—17.27)

(Granted under Title 35, U. S. Code (1952), sec. 266)

This invention relates to improvements in power transmission assemblies for helicopters and like aircraft.

In the present practice of helicopter design the sustaining rotor rotates about a vertical shaft that is driven either by a suitable prime mover located in the fuselage or by jet propulsion units mounted on the tips of the rotor blades. In the case of the shaft driven rotor a substantial speed reduction and torque multiplication device is required between the driving shaft and the rotor. This power transmission and clutch system results in a heavy unit subject to failures in the gears or bearings of the unit with the consequent risk of loss of the helicopter while in flight in addition to the expense of frequent inspections and replacements of the component parts. I have, therefore, made a thorough investigation of other possible methods of driving helicopter rotors. I have found that any rotors driven by an engine or other prime mover located in a non-rotating part of the helicopter structure, requires a system of torque correction. At present either a vertically mounted tail rotor or a co-axial arrangement of the main rotors are employed. Both of these are unsatisfactory from the standpoint of increased weight, power losses and complicated control mechanism. Another method sometimes proposed is a single rotor that is driven by jet propulsion units mounted on the rotor blades. However, the efficiency of these units is low and fuel consumption is too high to be satisfactory. Therefore, a rotor system having advantages that the aforementioned systems lack would have to consist of a self contained rotor unit with the driving system rotating with the rotor to eliminate torque reactions. Such a system has been described in U. S. Patent No. 1,813,852, dated July 7, 1931, wherein the rotor is driven by propellers mounted on the rotor blade. However, this system incorporates internal combustion engine units to drive the small propellers. Due to the effect of the centrifugal force on the operation of the internal combustion engines, such a drive mechanism has proven to be unsatisfactory. A gear train has also been employed to drive small propellers mounted on the rotor blades as described in U. S. Patent No. 1,909,450, dated May 16, 1933. Inasmuch as this method involves gears and drive shafts the arrangement is heavy and susceptible to failures of the components.

The present invention contemplates a method of driving the helicopter rotor by means of small propellers mounted on the rotor blade beams or separate beams, that are powered by hydraulic motors. In this manner the propelling unit is an integral assembly connected to the non-rotating fuselage. The pump and oil tank of the pressure system may either be mounted on the rotor head or may be installed in the fuselage near the source of power for the pump. Gear transmission systems and the heavy gear and clutch mechanisms are thereby eliminated with a consequent saving of weight and with increased reliability.

Accordingly, an object of this invention is to provide improved means for transmitting engine power to helicopter rotor blades whether standard blades such as set forth in my Patent No. 2,716,460 are used, the weight of which transmitting means is materially reduced over previously used and proposed helicopter power transmission systems and assemblies.

Another object of the invention is to carry out the above object by providing fluid motors located in such positions with respect to a main support column that upon actuation of the motors, the small propellers driven thereby apply turning moments to the column, and yet, have the blades and column arranged so that the blades are capable of folding and the column tilting to an inoperative position so that the helicopter may be stored in a relatively small space in a hanger aboard ship or on land.

Other objects and features will become apparent in following the description of the various forms of the invention.

In the drawings Fig. 1 is an elevational view of one form of the invention embodied in a merely suggestive fuselage configuration.

Fig. 2 is a plan view of the helicopter.

Fig. 3 is a plan view of a modified form of the helicopter.

Fig. 4 is a fragmentary longitudinal sectional view of the means for transmitting power from the schematically illustrated power plant-pump elements to the fluid motors, the rotor blades and swash plate assembly having been omitted.

Fig. 5 is a longitudinal sectional view showing another embodiment of the helicopter power transmission means.

Fig. 6 is a fragmentary sectional view illustrating a further modification of the power transmission means.

Fig. 7 is a fragmentary elevational view of the lower end of the rotor blade support column together with a mounting device for the column capable of allowing the column to swing to a lowered, inoperative position.

Fig. 8 is a transverse sectional view taken on the line 8—8 of Fig. 7.

Fig. 9 is a fragmentary and partially diagrammatic view of a blade beam hinge assembly which may be used with one or more of the various embodiments disclosed herein.

Fig. 10 is a perspective view of a hinge connected to a torsional retention device to be used in the event special blades are employed.

Figure 8A:
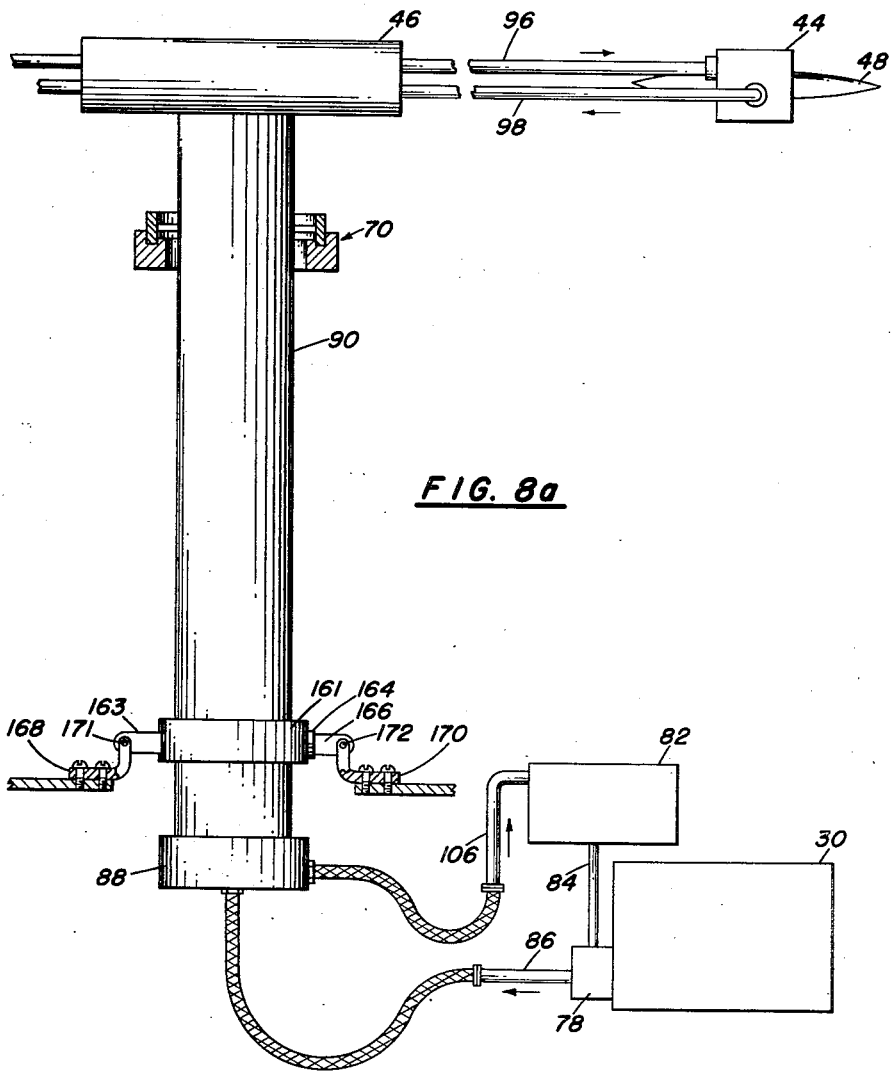
Fig. 8a is an elevational view of the form of the invention shown in Fig. 4 mounted for tilting movement.

Referring first to the general views of Figs. 1–3, the helicopter fuselage 20 is provided with a landing gear 22, an empennage 24 consisting of a rudder 26 and a stabilizer 28; and a power plant 30 of any standard type. For simplicity purposes various conventional controls for the empennage elements and other standard equipment has been omitted from the drawings. The rotor 32 includes rotor blades 34 and 36 which may be of any usual type or they may be constructed as disclosed in my previously identified copending application. In Figs. 1 and 2 the rotor has only two blades, while in Fig. 3 the rotor 32' is provided with four blades 38, 39, 40 and 41 respectively. These views illustrate the adaptability of the invention to a helicopter which has two or more rotor blades and show that the fluid motors may be mounted in various positions.

As a portion of the several means for transmitting power from the engine 30 to the rotor blades, the fluid motors 42 and 44 of Figs. 1 and 2 are shown mounted at opposite ends of a beam 46, each motor being provided with a propeller 48. In Fig. 3 the fluid motors 50 and 52 with their propellers 48 are mounted at the outer ends of the beams of the blades 38 and 39, the blades 40 and 41 supporting similar unshown motors and propellers. Even though the motors are shown at the outer ends of the beams, they may be mounted thereon at any spanwise location. Understandably, too, several rotors embodying the features of the invention may be arranged on the fuselage 20 in tandem or laterally disposed on booms.

Attention is now invited to Fig. 9 where the blades 34 and 36 are provided with the pilot's cyclic control mechanism including a pair of control linkages 56 and 58 releasably coupled at one end as by removable pins, to the crank arms 60 and 62 of the blade flap segment structure and conventionally connected at their opposite ends to the swash plate assembly 64 to which a control stick 66 is attached. The root ends of the blades 34 and 36 are connected to a single support column and drive shaft 90 by a mounting ring assembly 70. In instances where special blades are used such as disclosed in my copending application, torsional retention devices 72 are used with the rotor blades. Also, the blades may be provided with hinges 74 (Fig. 10) to allow them to be folded to an inoperative position thereby facilitating helicopter storage.

A large part of the foregoing relates to conventional helicopter structure and features set forth in detail in my copending application. The present invention has references primarily to the helicopter power transmission assemblies in Figs. 4–8. The power plant 30, for example an engine or turbine, is drivingly connected to a pump 78, the latter having a conduit system extending therefrom and arranged in such way as to form a closed fluid circuit 80. In Fig. 4 the fluid circuit 80 includes a surge chamber defined by the tank 82 which is connected by conduit 84 to the inlet side of the pump 78. A pipe 86 extends from the outlet side of the pump 78 and is passed through an aperture in the base of a socket 88, the latter being fastened to a part of the aircraft fuselage structure and opening upwardly to accommodate the hollow column or shaft 90. The lower end of the column 90 has a wall 92 through which a conduit 94 is passed to register with the conduit 86, whereby fluid under pump pressure may flow through the socket 88 and the conduit 94 which connects with a conduit 96 that feeds the motors 42 and 44. A return conduit 98 extends from fluid motors 42 and 44, passing through the beam 46, as does conduit 96, and connects with a conduit 100, the latter together with conduit 94 extending through the longitudinal passage of the hollow column 90. The conduit 100 is connected with a passage 102 which opens laterally through the edge of the wall 92 and registers with an annular groove 104 in the wall of the socket 88. Since a return conduit 106 communicates the groove 104 with the tank 82, fluid may flow through the above described fluid flow system from the pump 78 to the tank 82, thence to the pump. As illustrated, standard oil sealing means are used in the socket 88. Inasmuch as the single hollow column 90 forms the sole support for the rotor blades, it is externally supported on fuselage structure where required by bearings 110 and 112.

Reference is now made to Fig. 6 where the upper part of the hollow column 114 is the same as the column 90. The lower end of the column 114 is closed by a wall 116, through an opening in which the feed conduit 118 extends. One end of this conduit extends to the beam supported fluid motors and the opposite end thereof is communicated with the outlet of the engine driven pump 120. The return part of the circuit includes a return conduit 122 extending from the fluid motors and the hollow column 114. The conduit 122 empties through a nozzle 124 into the tank 126 which has the lower end of the column 144 disposed therein. An oil seal and bearing assembly 130 is located in the opening formed in the tank which accommodates the lower end of the column 114. An anti-foam screen 132 is located in the tank between the nozzle 124 and the inlet part of the conduit 136 which feeds fluid from the tank 126 to the inlet of the pump 120.

In Fig. 5 the engine 30 operates the variable displacement type pump 140, housed at the top of the rotor 32 or 32'. To accomplish this, shafting 142 is connected by a gear train 144 to the engine drive shaft 146, and the lay shaft 148 of said shafting 142 is disposed in the hollow rotor column 150. The upper end of the shaft 148 has a gear connection 152 with the pump 140 so that upon operation of the engine 30, the pump 140 is actuated to draw fluid from the tank 154 through the conduit 156 and deliver it to the beam supported motors through the feed conduits 158 and 160 whence the fluid returns to the tank 154 through the line 162.

As shown in Figs. 4–6 the hollow columns are mounted for rotation on the fuselage structure by external bearings 110 and 112. However for previously mentioned reasons it is desirable that the columns be capable of tilting. Therefore in Figs. 7 and 8 I have shown a structure adaptable to the various embodiments disclosed herein, which mounts the hollow columns for tilting movement. It consists of a collar 161 connected by a anti-friction bearing to the column, for example the column 90, the collar being provided with an arm 163 together with a diametrically opposed socket 164 in which a spindle 166 is pivotally located. The fuselage has secured thereto, by means of fasteners 173, two mounting brackets 168 and 170 which have the arm 163 and spindle 166 releasably connected therewith by means of locking pins 171 and 172 or some other standard fastening devices. Accordingly upon release of the arm 163 from its bracket 168, by pulling the pin 171 out of engagement therewith the column may be swung about the pin 172 as an axis, or the column 90 may be swung about the spindle 166 as an axis. Thus, the column 90 is adapted to be pivotally swung in either of two directions, about the axes 172 or 166, thereby allowing the column 90 to be folded downwardly reducing the overall height of the helicopter.

When the tilt structure of Figs. 7 and 8 is used with the embodiments of Figs. 4–6, the upper bearing 112 must be omitted, as best seen in Fig. 8a, or held in place on the fuselage structure by readily releasable means, as fastening pins or clamps. The bearing in collar 161 takes the place of the lower bearings 110. Also, the conduits 86 and 106 should be flexible as should be the conduits 118 and 136 in order to allow the column 90 and the column 114 to be swung to an inoperative position.

In operation the motive fluid is delivered to the various fluid motors carried on the blade beams or beams 46, through the fluid flow circuits of Figs. 4–6, the selection of which type of circuit to be used being governed largely by design size of the helicopter. The blades of the rotor are thus moved with the hollow column supporting them because the motors are laterally removed from the axis of rotation of the column so that upon actuation of the fluid motors, turning moments are applied to the column.

The various fluid flow circuits, support columns and fluid motors constitute several embodiments of transmissions for transferring engine power to the rotor blades by using a minimum number of parts and at a low weight expense. Moreover, to comply with minimum space requirements the blades may be folded at the hinges 74 and the support columns tilted when the helicopter is stored.

It is apparent that various changes may be made without departing from the scope of the following claims.

The invention described herein may be manufactured and used by or for the Government of the United States of America for governmental purposes without the payment of any royalties thereon or therefor.

What I claim is:

1. In a helicopter having a fuselage and rotor blades, an improved drive mechanism comprising a single axially-rotatable hollow column supporting said blades; a plurality of thrust producing means each including a fluid motor and a propeller carried by said column and laterally spaced from the axis of rotation of said column; a fluid power supply circuit connected to said means through said column and including flexible conduits;

and a mounting collar surrounding said column, said collar being pivotally connected to the fuselage by a spindle such that the column can be pivoted through substantially 90° either transversely of or longitudinally of the fuselage flexing the conduits accordingly, thereby decreasing the overall height of the helicopter.

2. In a helicopter having a fuselage and rotor blades, an improved drive mechanism comprising a single axially-rotatable hollow column supporting the blades; a plurality of thrust producing means each including a fluid motor and a propeller carried by said column and laterally spaced from the axis of rotation of the column; a fluid power supply circuit connected to said means through said column and including flexible conduits; and mounting means securing the column to the fuselage, said mounting means including a collar surrounding the column, a spindle having one end rotatably received in the collar and the opposite end pivotally attached to the fuselage, whereby said column can be pivoted through substantially 90° either transversely of or longitudinally of the fuselage flexing the conduits accordingly, thereby to decrease the overall height of the helicopter.

References Cited in the file of this patent

UNITED STATES PATENTS

| | | |
|---|---|---|
| 853,999 | Schmid | May 21, 1907 |
| 1,180,347 | Warren | Apr. 25, 1916 |
| 1,813,852 | Isacco | July 7, 1931 |
| 1,827,438 | Rauch | Oct. 13, 1931 |
| 1,892,187 | Drennon | Dec. 27, 1932 |
| 1,955,921 | Kusse | Apr. 24, 1934 |
| 2,022,481 | Schellenger | Nov. 26, 1935 |
| 2,301,417 | Larsen | Nov. 10, 1942 |
| 2,405,777 | Buivid | Aug. 13, 1946 |
| 2,514,822 | Wolfe | July 11, 1950 |
| 2,601,463 | Stanley | June 24, 1952 |